Figure 3:
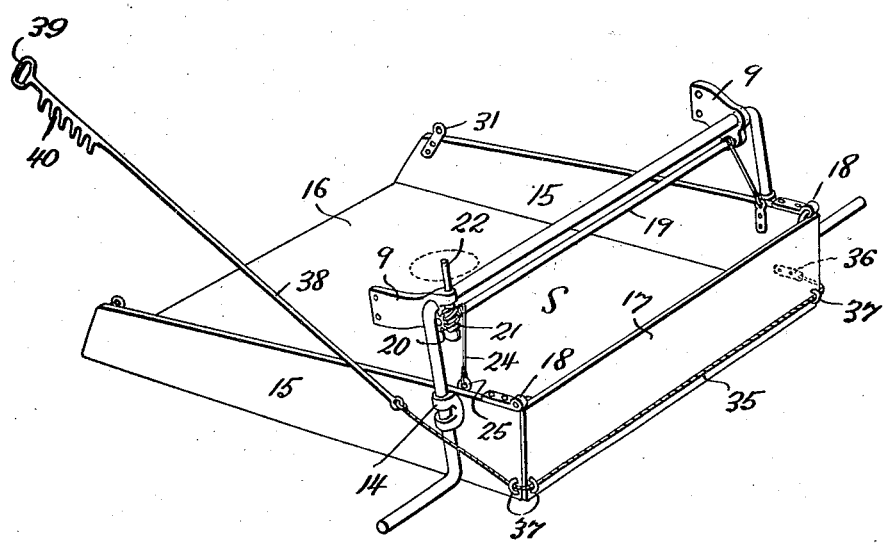

May 17, 1927.
A. R. VAN ALSTINE
1,629,242
FOUR-WHEELED SCRAPER
Filed May 24, 1926          2 Sheets-Sheet 1
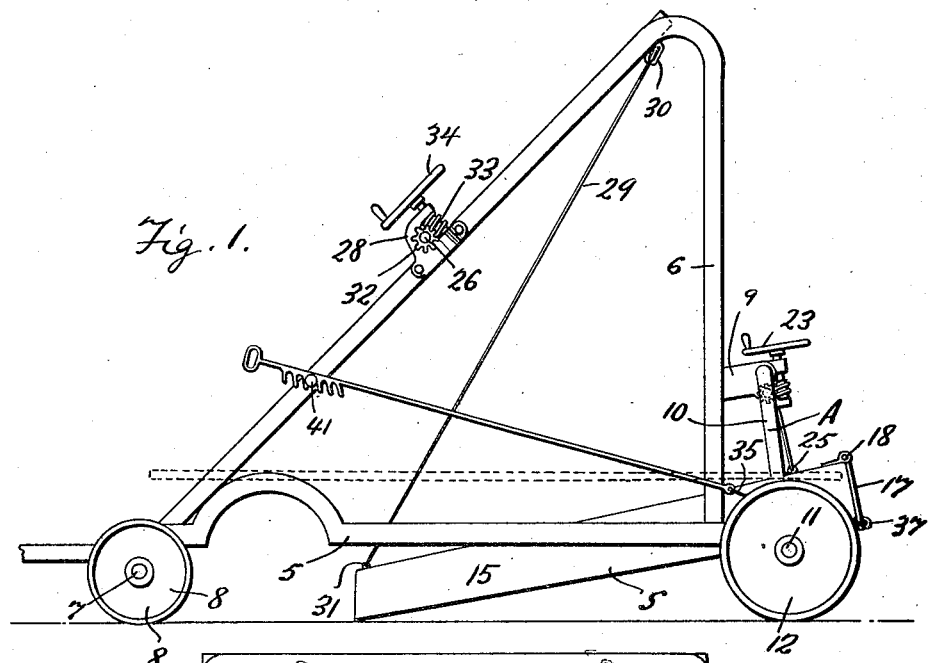
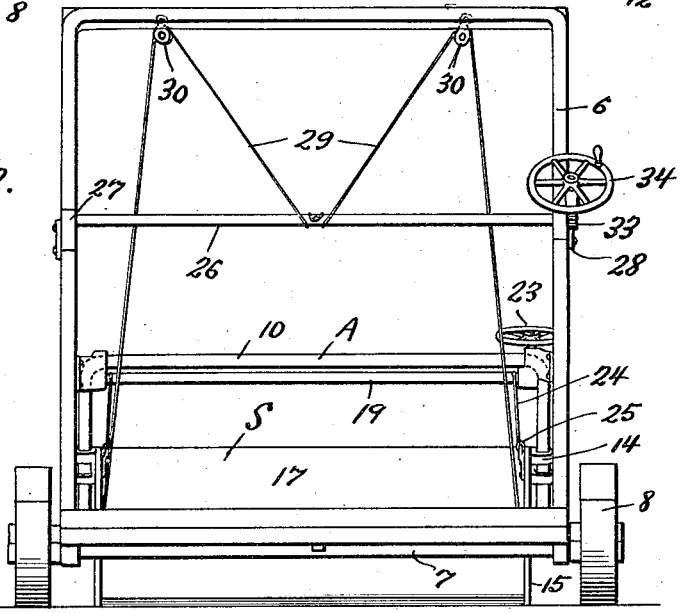
Inventor
Albert Roy Van Alstine
By Clarence A. O'Brien
Attorney May 17, 1927.

A. R. VAN ALSTINE 1,629,242

FOUR-WHEELED SCRAPER

Filed May 24, 1926

2 Sheets-Sheet 2

Inventor
Albert Roy Van Alstine

By Clarence A O'Brien

Attorney

Patented May 17, 1927.

1,629,242

UNITED STATES PATENT OFFICE.

ALBERT ROY VAN ALSTINE, OF CLEARWATER, FLORIDA.

FOUR-WHEELED SCRAPER.

Application filed May 24, 1926. Serial No. 111,307.

The present invention relates to a scraper, and has for its principal object to provide a structure wherein the scoop of the scraper is mounted on a four-wheeled supporting structure and is capable of being adjusted in its height from the ground and wherein the scraping edge thereof may be lifted out of engagement with the ground so that the dirt in the scoop may be hauled and dumped at a desirable place.

Another very important object of the invention is to provide a scraper of this nature which is particularly adapted to be hauled by a tractor and which is capable of being handled efficiently by one man.

A still further very important object of the invention resides in the provision of a scraper of this nature which possesses an exceedingly simple construction that is thoroughly reliable in its operation, easy to manipulate, strong, durable, and otherwise well adapted to the purpose for which it is designed.

With the above and numerous other objects in view as will appear as the description proceeds, the invention resides in certain novel features of construction, and in the combination and arrangement of parts as will be hereinafter more fully described and claimed.

In the drawing:—

Figure 1 is a side elevation of the contrivance embodying the features of this invention, Fig. 2 is a front elevation thereof, and Fig. 3 is a perspective view of the scoop thereof.

Referring to the drawing in detail, it will be seen that the numeral 5 denotes the chassis from which rises a super-structure 6. A front axle 7 is provided on the forward portion of the chassis 5 and has journaled thereon wheels 8. A rear axle A is mounted in brackets 9 projecting rearwardly from the super-structure 6. This rear axle A includes an intermediate U-shaped portion 10 terminating in stub axles 11 on which are journaled the rear wheels 12. On the side arms of the intermediate portion 10 of the axle A there are slidable guides 14 which are attached to the side walls 15 of a scoop S which also includes a bottom 16 and a rear wall 17 hinged to the side walls as at 18.

A shaft 19 is journaled in the brackets 9 and has a worm gear 20 thereon, meshing with a worm 21 on a shaft 22 journaled in one of the brackets 9 and operable by a hand wheel 23. Cables 24 are windable on the shaft 19 and are attached as at 25 to the upper edges of the sides 15 adjacent the rear walls 17.

A shaft 26 is journaled in suitable brackets 27 and 28 on the forward portion of the super structure 6 and cables 29 are windable thereon and trained over pulleys 30 at the top of the super-structure 6 and engaged as at 31 with the forward ends of the walls 15 of the scoop S. A worm gear 32 is fixed to the shaft 36 adjacent bracket 28. A worm 33 is journaled in the bracket 28 operable by a hand wheel 34 and meshes with the worm gear 32. It will thus be seen that by operation of the hand wheel 34, the cables 29 may be wound and unwound from the shaft 26 for raising and lowering the forward end of the scoop S.

A cable 35 is anchored as at 36 to one side wall 15 and is trained through eyes 37 on the side walls and the end wall 17 adjacent the bottom edges thereof and is fixed to a rod 38 terminating in a handle 39, and adjacent the handle 39 there is provided a portion having a series of notches 40 for engagement with a pin 41 on the forward portion and to one side of the super-structure 6. When the parts are disposed as is clearly shown in Fig. 1, it will be seen that by operating the hand wheel 23, the rear end of the scoop S may be raised and lowered the desired distance from the ground to adjust the angle of the scoop thereto. After the track bar has pulled the scoop a distance and said scoop has become filled with dirt, it will be seen that the hand wheel 34 may be operated for lifting the forward end of the scoop so that the contrivance may be taken to a dumping place, and then the forward end of the scoop may be raised above the horizontal and the handle 39 grasped to disengage one of the notches 40 from the pin 41, thereby permitting the rear wall 17 to swing at its bottom edge rearwardly so that the dirt may pass out of the scoop.

It is thought that the construction, operation, and advantages of this invention will now be clearly understood by those skilled in this art without a more detailed description thereof. The present embodiment of the invention has been disclosed merely by way of example, since in actual practice it attains the features of advantage enumerated as desirable in the statement of the invention and the above description.

It will be apparent that numerous changes in the details of construction, and in the combination and arrangement of parts may be resorted to without departing from the spirit or scope of the invention as hereinafter claimed, or sacrificing any of its advantages.

Having thus described my invention, what I claim as new is:—

1. A contrivance of the class described including a chassis, a front axle on the chassis, wheels journaled on the ends of the front axle, a super-structure rising from the chassis, a rear axle having an intermediate inverted U-shaped portion journaled on the rear of the super-structure, wheels journaled on the ends of the rear axle, a scoop having guides fixed thereto slidable on the arms of the intermediate portion of the rear axle, means for raising and lowering the rear end of the scoop, a shaft journaled on the super-structure, pulleys mounted at the top of the super-structure, cables windable on the shaft and trained over the pulleys and fixed to the forward end of the scoop, means for rotating the shaft, eyes provided on the rear wall of the scoop, means for hinging the rear wall of the scoop at the top thereof, a cable anchored to one side of the scoop trained through the eyes of the rear wall, a rod attached to the last mentioned cable and having a plurality of notches in one end thereof, and a pin on the super-structure for engagement by the notches to hold the rear wall in a closed position.

2. A contrivance of the class described including a wheeled frame, a scoop on the frame, eyes fixed on the rear wall of the scoop, means for hinging the rear wall of the scoop at the top thereof, a cable anchored to one side of the scoop and trained through the eyes of the rear wall, a rod attached to the cable and having a plurality of notches in one end thereof, and a pin on the frame for engagement by the notches to hold the rear wall in a closed position.

In testimony whereof I affix my signature.

ALBERT ROY VAN ALSTINE.